(12) United States Patent
Yamada

(10) Patent No.: US 6,938,078 B1
(45) Date of Patent: Aug. 30, 2005

(54) DATA PROCESSING APPARATUS AND DATA PROCESSING METHOD

(75) Inventor: Yoshihisa Yamada, Yamanashi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/440,157

(22) Filed: Nov. 15, 1999

(30) Foreign Application Priority Data

Dec. 9, 1998 (JP) ................................. 10-350456

(51) Int. Cl.$^7$ .......................................... G06F 15/177
(52) U.S. Cl. ..................... 709/220; 709/214; 712/13
(58) Field of Search ............................... 709/213, 214, 709/215, 216, 220, 221; 712/13, 14, 15

(56) References Cited

U.S. PATENT DOCUMENTS

| | | | | |
|---|---|---|---|---|
| 5,307,495 A | * | 4/1994 | Seino et al. ................. | 712/106 |
| 5,428,803 A | * | 6/1995 | Chen et al. ..................... | 712/6 |
| 5,590,301 A | * | 12/1996 | Guenthner et al. ......... | 711/202 |
| 5,617,537 A | * | 4/1997 | Yamada et al. ............. | 709/214 |
| 5,649,106 A | * | 7/1997 | Tsujimichi et al. ......... | 709/221 |
| 5,781,775 A | * | 7/1998 | Ueno .......................... | 709/102 |
| 5,931,938 A | * | 8/1999 | Drogichen et al. ........... | 712/15 |
| 6,085,303 A | * | 7/2000 | Thorson et al. ................ | 712/16 |
| 6,094,532 A | * | 7/2000 | Acton et al. .................... | 712/28 |
| 6,148,349 A | * | 11/2000 | Chow et al. .................... | 710/33 |
| 6,148,377 A | * | 11/2000 | Carter et al. ................. | 711/147 |
| 6,282,583 B1 | * | 8/2001 | Pincus et al. ................ | 709/400 |
| 6,295,585 B1 | * | 9/2001 | Gillett, Jr. et al. .......... | 711/148 |
| 6,442,670 B2 | * | 8/2002 | Acton et al. .................... | 712/28 |
| 6,611,911 B1 | * | 8/2003 | O'Shea et al. .................. | 713/1 |

FOREIGN PATENT DOCUMENTS

| | | |
|---|---|---|
| JP | 50-36041 | 4/1975 |
| JP | 53-139939 | 12/1978 |
| JP | 58-33766 A | 2/1983 |
| JP | 58-103053 A | 6/1983 |
| JP | 58-144273 A | 8/1983 |
| JP | 64-12364 A | 1/1989 |

(Continued)

*Primary Examiner*—Kenneth R. Coulter
(74) *Attorney, Agent, or Firm*—Sughrue Mion, PLLC

(57) ABSTRACT

A data processing apparatus of the present invention includes a plurality of nodes each of which includes at least one processor and which is divided to a plurality groups, a bus to which the nodes are connected, and memory elements provided in the nodes, respectively. Shared memory areas are provided in the groups, respectively, and the nodes access to the shared memory areas. Another data processing apparatus of the present invention includes a plurality of nodes each of which includes at least one processor, a bus to which the nodes are connected, and memory elements provided in the nodes, respectively. The apparatus has a first element which sets the nodes to clusters. A method for data processing in a data processing apparatus, which includes a plurality of nodes divided to a plurality of groups, a bus to which the nodes are connected, and shared memory areas corresponding to the groups, respectively, includes outputting a request addressed to the shared memory area to the bus by one of the node, determining in each of the nodes whether the shared memory, to which the request is addressed, is owned by its one node, and accessing to the shared memory in one of the nodes which determines the shared memory is owned by its own node during the determining step.

13 Claims, 5 Drawing Sheets

FOREIGN PATENT DOCUMENTS

| | | |
|---|---|---|
| JP | 1-106150 A | 4/1989 |
| JP | 1-134656 A | 5/1989 |
| JP | 1-180655 A | 7/1989 |
| JP | 2-141863 A | 5/1990 |
| JP | 3-271861 A | 10/1992 |
| JP | 4-278662 A | 10/1992 |
| JP | 6-231033 | 8/1994 |
| JP | 7-509085 A | 10/1995 |
| JP | 10-40222 A | 2/1998 |
| JP | 10-40229 A | 2/1998 |
| JP | 844 559 A2 | 5/1998 |
| JP | 848 327 A2 | 6/1998 |
| JP | 10-228458 A | 8/1998 |
| JP | 10-240707 A | 9/1998 |

* cited by examiner

DATA PROCESSING APPARATUS AND DATA PROCESSING METHOD

BACKGROUND OF THE INVENTION

The present invention relates to a data processing apparatus and method, and more specifically, to a data processing apparatus which has a plurality of nodes, each of which includes one or more processors and a main storage device and which is configured to clusters, and to a data processing method implementing said apparatus.

In a conventional data processing apparatus, a plurality of clusters, each of which has one or more CPUs and a main storage device, are interconnected through a network. Clusters process data concurrently. An example of such a conventional data processing apparatuses is disclosed in Japanese Patent Laid-Open No. Hei. 6-231033.

In the conventional data processing apparatus, each cluster is connected through a network, and the communications between the clusters are performed using an extended memory. However, this creates a problem because the size of the entire system increases and the communication speed between the clusters decreases.

In addition, once an apparatus is designed, a designed cluster configuration cannot be easily changed in the conventional data processing apparatus. This creates a problem because few configuration changes are allowed when a cluster configuration is changed, depending on the purpose of the operation of a system.

SUMMARY OF THE INVENTION

An object of the invention is to provide a small data processing apparatus that has a cluster configuration.

Another object of the invention is to provide a data processing apparatus in which communications between clusters is performed at a high speed.

Another object of the invention is to provide a data processing apparatus which allows a user to arbitrarily design the clusters in the system depending on the purpose of the system operation.

According to one aspect of the present invention, a data processing apparatus is provided which includes: a plurality of nodes, each of which includes at least one processor and which are divided to a plurality groups; a bus to which the nodes are connected; memory elements provided in the nodes, respectively; and shared memory areas which is provided in the groups, respectively, and to which the nodes access.

According to another aspect of the present invention, a data processing apparatus is provided which includes: a plurality of nodes, each of which includes at least one processor; a bus to which the nodes are connected; memory elements provided in the nodes, respectively; and a first element which sets the nodes to clusters.

According to another aspect of the present invention, a method for data processing in a data processing apparatus, which includes a plurality of nodes divided into a plurality of groups, a bus to which the nodes is connected, and shared memory areas corresponding to the groups, respectively, is provided which includes: outputting a request addressed to the shared memory area to the bus by one of the nodes; determining in each of the nodes whether the shared memory, to which the request is addressed, is owned by its own node; and accessing to the shared memory in one of the nodes which determines the shared memory is owned by its own node during the determining step.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

A first embodiment of the present invention will be described in detail below.

Figure 1:
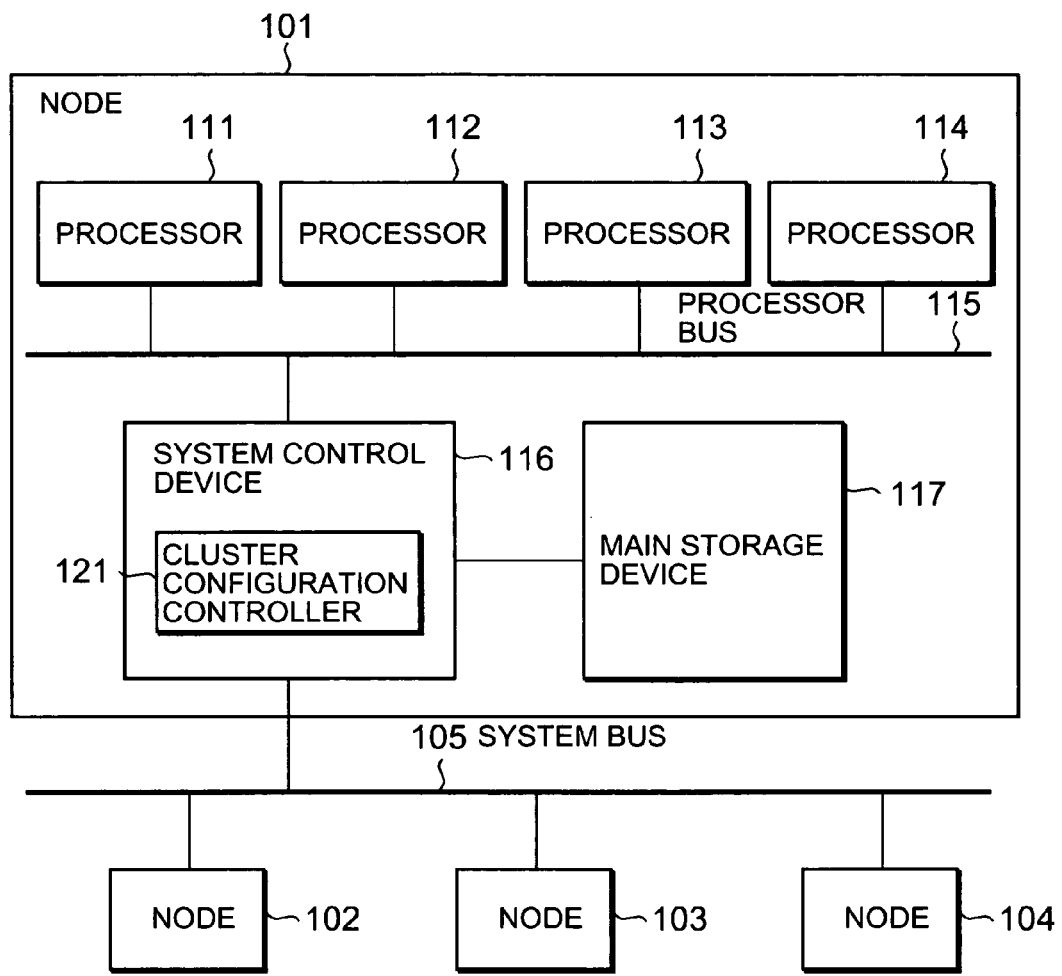
FIG. 1 is a block diagram of the present invention.

Referring to FIG. 1, a data processing apparatus has a plurality of nodes. The nodes are interconnected through a system bus 105. In this embodiment, four nodes 101 through 104 are provided in the data processing apparatus. Each node comprises, as represented by node 101, four processors 111 through 114, a system control device 116, and a main storage device 117. Each processor is connected to system control device 116 through a processor bus 115. System control device 116 is connected to system bus 115 and main storage device 117.

Similarly, a system control device, four processors, and a main storage device are provided in the other nodes 102 through 104. Accordingly, there are four system control devices, sixteen processors, and four main storage devices in the entire system. In addition, the memory space of main storage device 117 of each node is set by the settings of each register of a cluster configuration controller 121 as a specific memory of a group, to which each node belongs, and a shared memory owned by the group, to which the node belongs. In the present embodiment, while each node is connected through a system bus, and each processor is connected through a processor bus, they may be connected as star connection.

Figure 2:
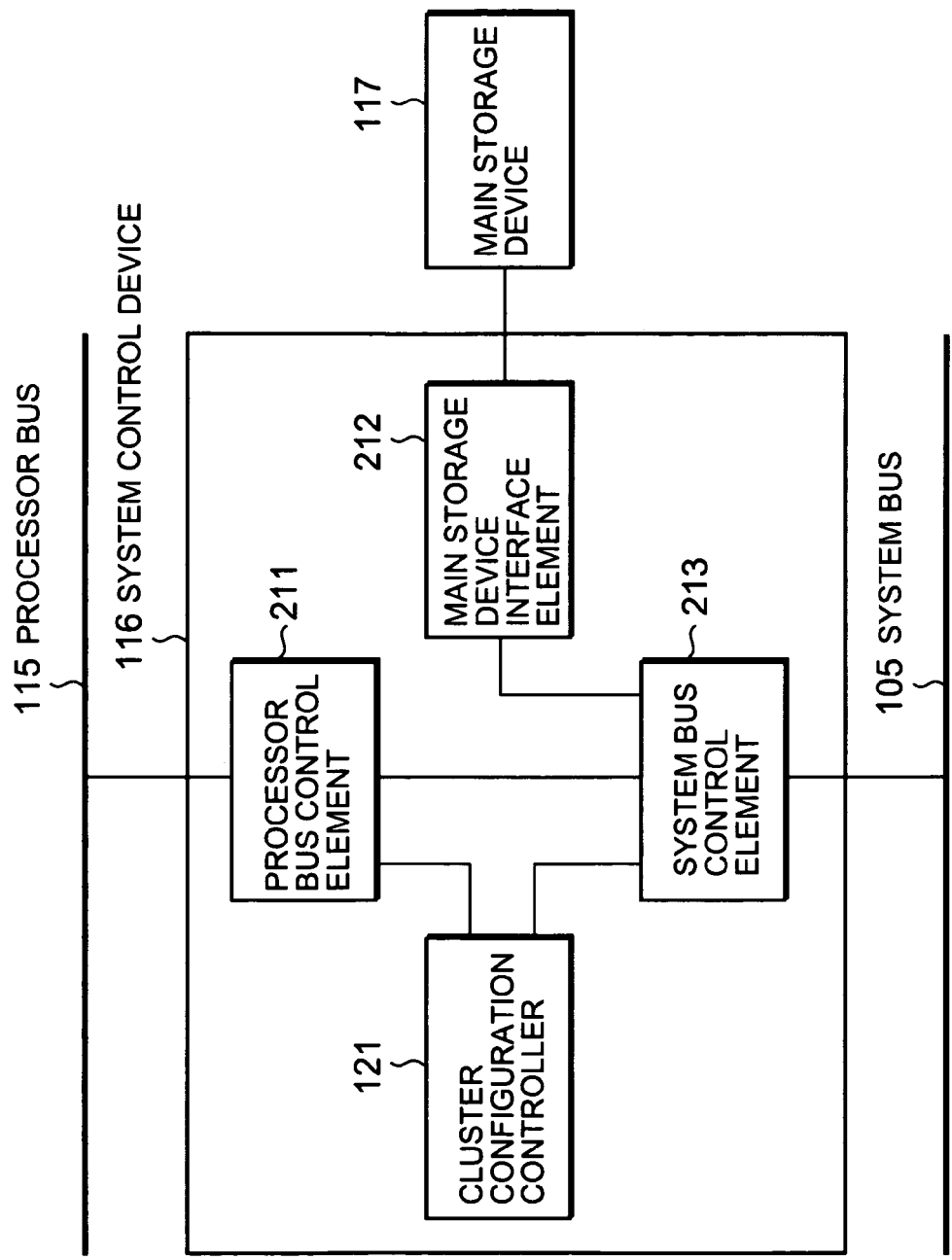
FIG. 2 is a block diagram of the system control device of the present invention.

FIG. 2 shows the configuration of system control device 116 that is provided in each of nodes 101 through 104. System control device 116 comprises a processor bus control element 211, a main storage device interface element 212, a system bus control element 213, and a cluster configuration controller 121. Processor bus control element 211 is connected to a processor bus 115. Main storage device interface element 212 is connected to main storage device 117. System bus control element 213 is connected to system bus 105. In addition, processor bus control element 211 is connected to system bus control element 213. System bus control element 213 is further connected to main storage device interface element 212. Cluster configuration controller 121 is connected to processor bus control element 211 and system bus control element 213.

Each of processors 111 through 114 and the processors not shown, but provided in nodes 102 through 104, can access the specific memory of a group to which the processor belongs (hereinafter referred to as a "own group"), the shared memory owned by the own group, and the shared memory owned by another group to which the processor does not belong (hereinafter referred to as "another group"), but cannot access the specific memory of another group. In addition, each processor can refer to but cannot change, the content of the shared memory owned by another group.

Figure 3:
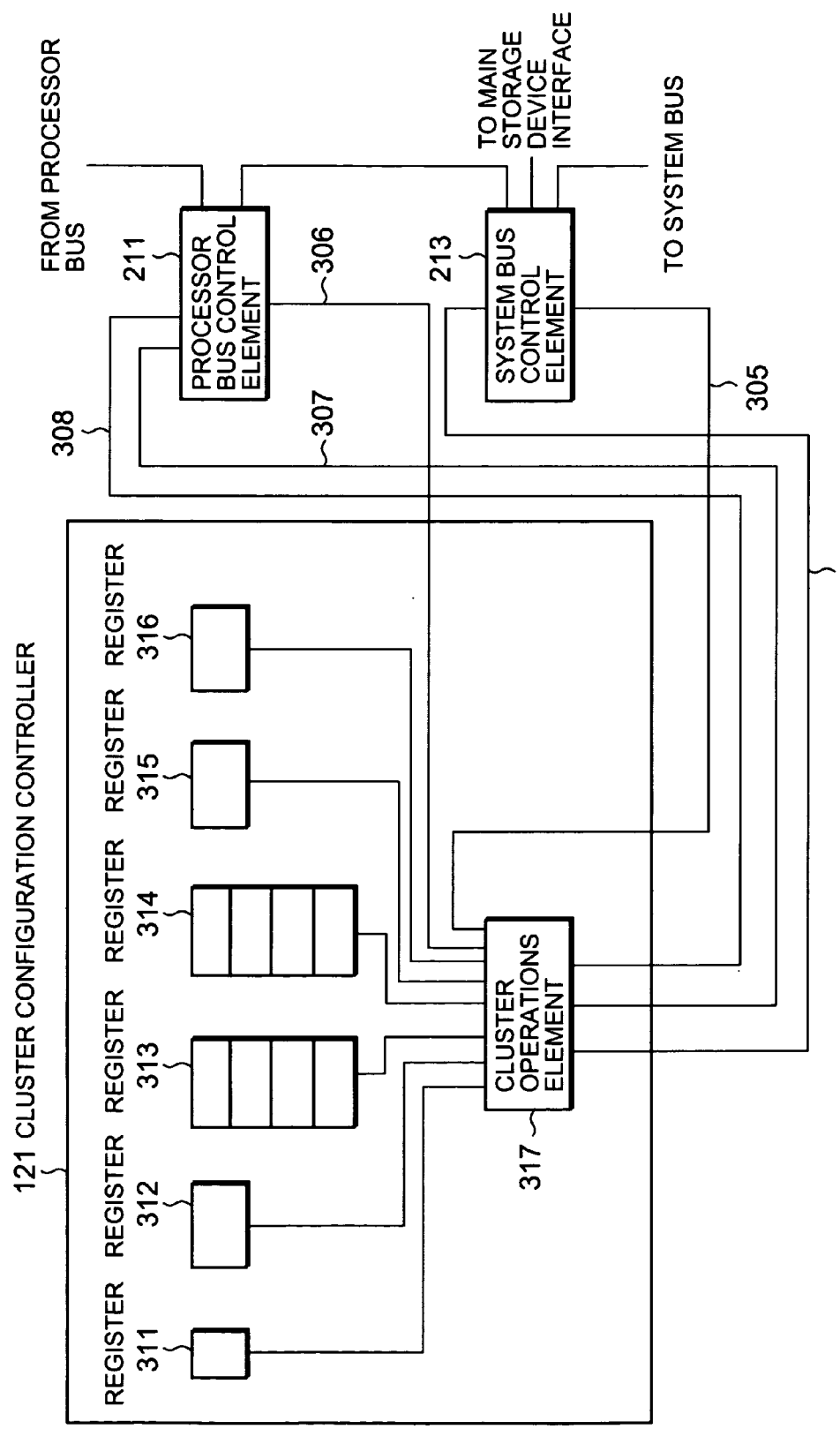
FIG. 3 is a block diagram of the cluster configuration controller of the first embodiment of the present invention.

FIG. 3 shows an example of a configuration of cluster configuration controller 121. Since one system comprises four nodes in this embodiment, the number of groups forming a cluster is a maximum of four. If the number of groups is four, each group comprises one node.

Cluster configuration controller 121 comprises a cluster operations element 317 and six registers 311 through 316. Register 311 indicates the effectiveness/ineffectiveness of the cluster configuration. Register 312 indicates the node number of the own node. Register 313 indicates the group number of the group to which each node belongs. Register 314 indicates the node number of a node having shared memory owned by each group. Register 315 indicates the size of shared memory. Register 316 indicates the base address of the shared memory. The values of these registers are set by processors 111 through 114 of node 101 and the processors not shown, but provided in nodes 102 through 104, or a service processor (not shown) when a system is initialized.

By setting these registers, a cluster configuration can be realized in a system. As described below in detail, each register is used for determining whether or not a cluster configuration is effective, whether the processor is accessing the specific memory of the own group or accessing the specific memory of another group, whether access is gained to the shared memory owned by the own group or to the shared memory owned by another group, and in detecting illegal access.

Register 311 is a 1-bit register indicating whether or not the cluster configuration is effective in the system. That is, when register 311 is set to 1, the cluster configuration is effective, and the values set in registers 313 through 316 are significant.

Register 312 is a 2-bit register indicating the node number of the own node.

Register 313 has a plurality of entries. The number of the entries in register 313 equals the number of nodes forming a cluster (four in this embodiment). Register 313 indicates the group number of the group to which each node belongs. Each entry has two bits. When a cluster configuration is realized in a system, one or more nodes are set as a group, and a node or nodes belonging to the group are operated by an independent operating system. Accordingly, when a plurality of nodes are set as the same group, the entry of register 313 is set to the same group number in the nodes belonging to the same group.

Register 314 has entries corresponding to each node (four entries in this embodiment), and indicates the node number of a node having shared memory which is owned by a group to which each node belongs. Each entry is a 2-bit register.

Register 315 indicates the capacity of the shared memory owned by the group to which the own node belongs.

Register 316 indicates the base address in the memory space address of the shared memory owned by the group to which the own node belongs.

Upon receipt of an address signal 306 requesting access to the shared memory from processor bus control element 211, cluster operations element 317 determines whether the address indicates access to the shared memory of the own group, or access to the shared memory of another group. Cluster operations element 317 notifies processor bus control element 211 of the determination result using a signal 307. Cluster operations element 317 obtains the group number of the own node by using the contents of register 312 and register 313, and notifies processor bus control element 211 of the result using a signal 308.

Furthermore, upon receipt of an address signal 304 requesting access to the specific memory of each group from system bus control element 213, cluster operations element 317 refers to registers 313 through 316 and register 311, and determines whether the address indicates the access to the specific memory of the own group, or to the specific memory of another group. Cluster operations element 317 notifies system bus control element 213 of the determination result using a signal 305.

Figure 5:
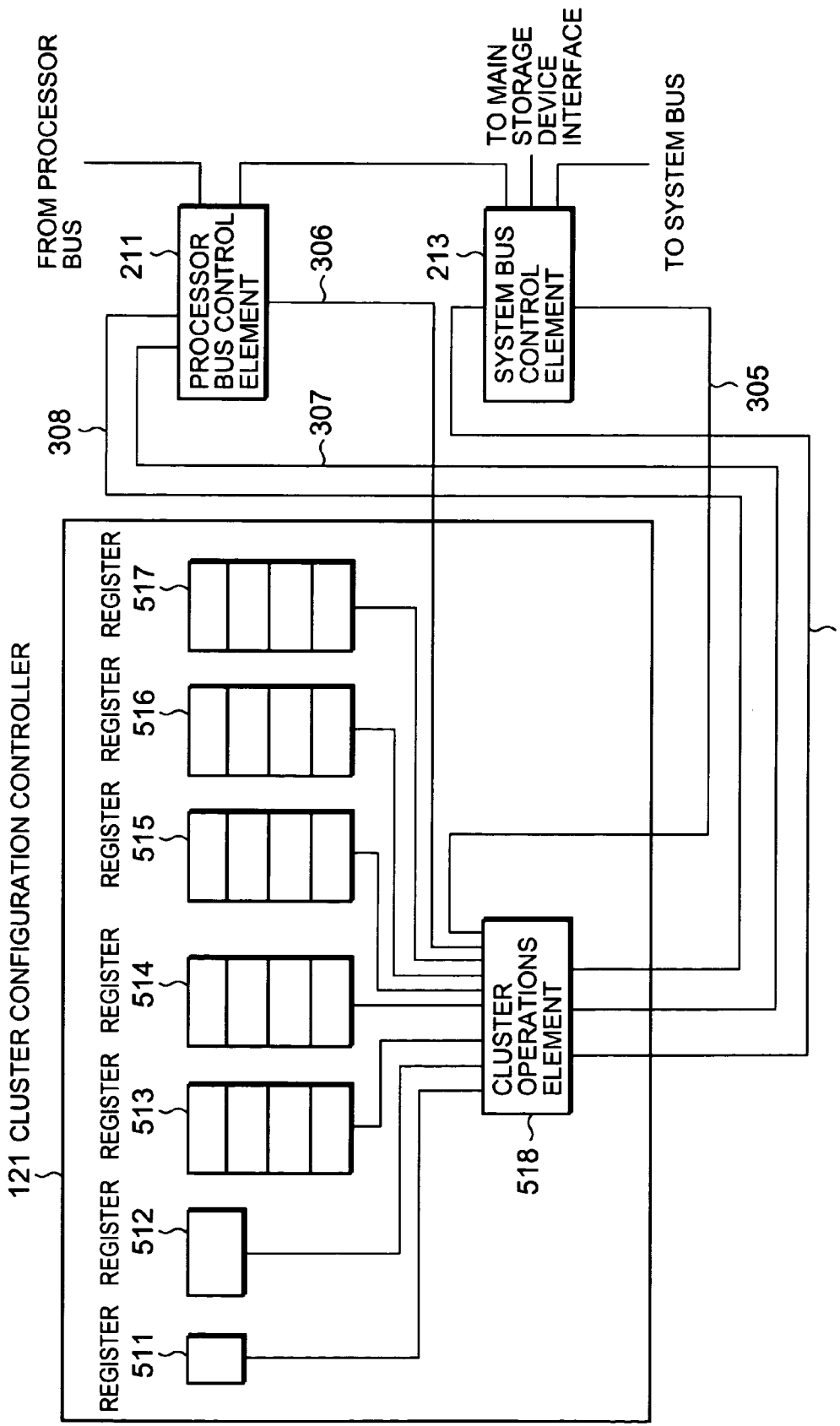
FIG. 5 is a block diagram of the cluster configuration controller of the second embodiment of the present invention.

FIG. 5 shows an example of the format of the address preferably used in this invention. The format is used when a processor accesses the specific memory of the own group, and the shared memory of the own group or another group. In this example, bits 0 through 60 of 64 bits are used as the real address space, and bits 61 through 63 are used when a shared memory is accessed. That is, when a processor accesses the shared memory, bit 63 is set to 1, and bits 61 and 62 are set to a group number so that the address of the shared memory space can be specified by bits 0 through 60. On the other hand, when a processor accesses the specific memory of the own group, bits 61 through 63 are set to 000 and an address is specified by bits 0 through 60.

With the above described configuration, in a data processing apparatus having a system including a plurality of nodes comprising one or more CPUs and one main storage device, each node can be operated in a plurality of groups each of which operates by an independent operating system. The groups can communicate with each other through the shared memory at a high speed.

Next, the operation of the embodiment will be described.

When register 311 is 0, the system is operated by one operating system as in a conventional system. Therefore, described below is the case in which register 311 is 1, that is, the system has a cluster configuration.

The operation when a request for access to the specific memory of the own group has been issued from a processor to the own group will be described below.

When a processor issues a request, the request is transmitted to processor bus control element 211 through the processor bus 115. Since bit 63 of the address of the request is 0, processor bus control element 211 recognizes that the request is addressed to the specific memory. Processor bus control element 211 sets bits 61 and 62 of the address of the request to the group number of the group to which the own node belongs, and transmits the request to system bus control element 213. The group number is set based on the output signal 308 from cluster configuration controller 121.

System bus control element 213 issues the request transmitted from processor bus control element 211 to system bus 105. The system bus control units 213 of all nodes 101 through 104 receive the request through system bus 105, and transmits the address to each cluster configuration controller 121. Since the 63 of the address of this request is 0, each cluster configuration controller 121 recognizes that this request is addressed to the specific memory.

By referring to the values of bits 61 and 62 of the address and registers 312 and 313, cluster configuration controller 121 determines whether or not this request is addressed to the group to which the own node belongs, and reports the result to system bus control element 213.

When the report indicates that the access is addressed to the specific memory of the own group, system bus control element 213 sets bits 61 and 62 of the address to 00, and transmits the request to main storage device interface element 212.

Upon receipt of the request from system bus control element 213, main storage device interface element 212 issues the request to main storage device 117, and the request is processed according to a predetermined procedure.

On the other hand, when the report from cluster configuration controller 121 to system bus control element 213 indicates that the access is addressed to the specific memory of another group, system bus control element 213 discards the request.

Next, the operation when a processor has issued a request to access a shared memory will be described.

When a processor issues a request, the request is transmitted to processor bus control element 211 through processor bus 115. Since bit 63 of the address of the request is 1, processor bus control element 211 recognizes that the request is addressed to the shared memory, and transmits the address signal 306 of the request to cluster configuration controller. 121. Since bit 63 of the address is 1, cluster configuration controller 121 recognizes that this request is addressed to the shared memory. Cluster configuration controller 121 refers to the values of bits 61 and 62 of the address of the request, resisters 313 through 316, and register 312, and determines whether or not the request refers to the access to the group to which the own node belongs. Cluster configuration controller 121 reports the determination result to processor bus control element 211.

At this time, cluster configuration controller 121 determines whether or not the address of the request is beyond the scope of the address range indicated by registers 315 and 316. If it is beyond the scope, then it is determined that the access is illegal, and the information is reported to processor bus control element 211.

Even when processor bus control element 211 receives the report that the address of the request is an appropriate address within the scope of the address range, processor bus control element 211 recognizes the access as illegal if the request is a write access and is addressed to the shared memory owned by another group. When an illegal access is detected, a fault process is activated. Since such a fault process is well-known, the explanation has been omitted.

When an illegal access is not detected, processor bus control element 211 issues the request to system bus control element 213. System bus control element 213 transmits the request to system bus 105.

System bus control element 213 of all nodes 101 through 104 receives the request through system bus 105, and transmit the address to each of the 10 corresponding cluster configuration controller 121. Since bit 63 of the address of this request is 1, each cluster configuration controller 121 recognizes that this request is addressed to the shared memory. Cluster configuration controller 121 determines whether or not the request is issued to the shared memory based on the contents of register 314 and the group number included in the address.

System bus control element 213 sets bits 61 through 63 of the address to 000, and transmits the request to main storage device interface element 212 of the own node. Upon receipt of the request from system bus control element 213, main storage device interface element 212 issues the request to main storage device 117, and the request is processed according to a predetermined procedure.

Next, a second embodiment of the present invention will be described in detail.

Since the configuration according to the second embodiment is the same as that of the first embodiment, except the configuration of cluster configuration controller 121, a detailed explanation has been omitted. Since one system also contains four nodes in the second embodiment, the number of groups forming a cluster is a maximum of four. When the number of groups is four, each group comprises one node.

Figure 4:
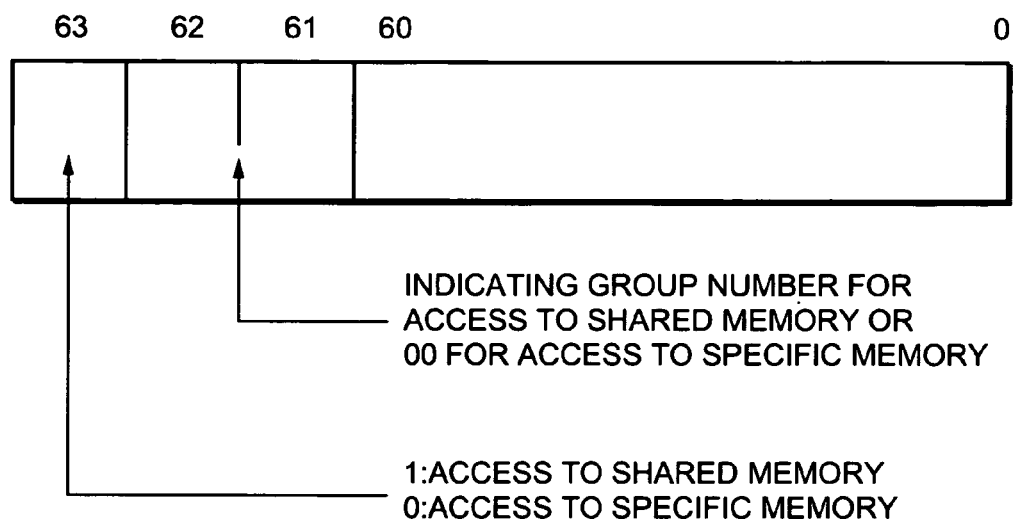
FIG. 4 shows a format of an address used in the data processing apparatus of the present invention.

Referring to FIG. 4, cluster configuration controller 121 comprises a cluster operations element 518 and seven registers 511 through 517. Register 511 indicates the effectiveness/ineffectiveness of the cluster configuration. Register 512 indicates the node number of the own node. Register 513 indicates the lowest order address of the memory space of each node. Register 514 indicates the highest order address of the memory space of each node. Register 515 indicates the group number of the group to which each node belongs. Register 516 indicates the size of the shared memory of each group. Register 517 indicates the base address of the shared memory of each group.

As in the first embodiment, the values of registers 511 through 517 are set by processors 111 through 114 of node 101 and the processors not shown, but provided in nodes 102 and 103, or a service processor (not shown) when a system is initialized.

Register 511 is a 1-bit register indicating whether or not a cluster configuration is effective in a data processing apparatus. That is, when register 511 is set to 1, the cluster configuration is effective, and the values set in registers 512 through 517 are significant.

Register 512 is a 2-bit register indicating the node number of the own node.

Register 513 has a plurality of entries. The number of entries of register 513 equals the number of nodes (four in this embodiment). Register 513 indicates the lowest order address of the address space of the main storage device of each node. Register 513 is, for example, a 61-bit register.

Register 514 has a plurality of entries. The number of entries of register 514 equals the number of nodes (four in this embodiment). Register 514 indicates the highest order address of the address space of the main storage device of each node. Register 514 is, for example, a 61-bit register.

Register 515 has a plurality of entries. The number of entries of register 515 equals the number of nodes (four in this embodiment). Register 515 indicates the group number of the group to which each node belongs. Each entry has two bits. When a cluster configuration is realized in a system, one or more nodes are set as a group, and a node or nodes belonging to a group are operated by an independent operating system. Therefore, when a plurality of nodes are set as the same group, the entries of register 515 are set to the same group number for the nodes belonging to the same group.

Register 516 has entries corresponding to each group (a maximum of four in this embodiment), and indicates the capacity of the shared memory owned by each group.

Register 517 has entries corresponding to each group (a maximum of four in this embodiment), and indicates the base address of the memory space address of the shared memory owned by each group.

Upon receipt of address signal 306 requesting access to the shared memory from processor bus control element 211, cluster operations element 518 determines whether the address indicates the access to the shared memory of the own group or the access to the shared memory of another group. Cluster operations element 518 notifies processor bus control element 211 of the determination result by using signal 307. Cluster operations element 518 obtains the group number of the own node by using the contents of registers 512 and 515, and notifies processor bus control element 211 of the obtained number using signal 308.

On the other hand, upon receipt of address signal 305 requesting access to the specific memory of each group from system bus control element 213, cluster operations element 518 refers to registers 512 and 515, and determines whether the address indicates the access to the specific memory of the own group, or the access to the specific memory of another group. Cluster operations element 518 notifies system bus control element 213 of the determination result using signal 305.

Next, the operation of the embodiment will be described.

When register 511 is 0, the system is operated by one operating system as in a conventional system. Therefore, the explanation of these operations has been omitted. Described below is the case in which register 511 is set to 1, that is, a cluster configuration is effective in a system.

The operation when a request to access the specific memory of the own group has been issued will be described below.

When a processor issues a request to access memory, the request is transmitted to processor bus control element 211 through the processor bus 115. Since bit 63 of the address of this request is 0, processor bus control element 211 recognizes that the request is addressed to the specific memory. Processor bus control element 211 sets bits 61 and 62 of the address of the request to the group number of the group to which the own node belongs, and transmits the request to system bus control element 213. The group number is set based on signal 308 from cluster configuration controller 121.

System bus control element 213 issues the request transmitted from processor bus control element 211 to system bus 105. The system bus control units 213 of all nodes 101 through 104 receive the request through system bus 105, and transmits the address to each cluster configuration controller 121. Since bit 63 of the address of this request is 0, each cluster configuration controller 121 recognizes that this request is addressed to the specific memory.

By referring to the values of bits 61 and 62 of the address and registers 512 and 515, cluster configuration controller 121 determines whether or not this request is addressed to the group to which the own node belongs. When the request is addressed to a group to which the own node belongs, cluster configuration controller 121 determines whether the request is addressed to the own node by referring to registers 513 and 514, and reports the result to system bus control element 213.

When the report indicates that the access is addressed to the specific memory of the own node, system bus control element 213 sets bits 61 and 62 of the address to 00, and transmits the request to main storage device interface element 212.

Upon receipt of the request from system bus control element 213, main storage device interface element 212 issues the request to main storage device 117, and the request is processed according to a predetermined procedure.

On the other hand, when the report from cluster configuration controller 121 to system bus control element 213 does not indicate that the access is addressed to the memory of the own node, system bus control element 213 discards the request.

Next, the operation when a processor has issued a request to access a shared memory will be described.

When a processor issues a request to access the memory, the request is transmitted to processor bus control element 211 through processor bus 115. Since bit 63 of the address of this request is 1, processor bus control element 211 recognizes that the request is addressed to the shared memory, and transmits address signal 306 of the request to cluster configuration controller 121. Since bit 63 of the address is 1, cluster configuration controller 121 recognizes that this request is addressed to shared memory. Cluster configuration controller 121 refers to the values of bits 61 and 62 of the address of the request, resisters 512 and 515, and determines whether or not the request is addressed to the group to which the own node belongs. Cluster configuration controller 121 reports the determination result to processor bus control element 211.

At this time, cluster configuration controller 121 determines whether or not the address of the request is beyond the scope of the address range indicated by registers 513, 514, 516, and 517. If it is beyond the scope, then it is determined that the access is illegal, and the information is reported to processor bus control element 211.

Even when processor bus control element 211 receives the report that the address of the request is an appropriate address within the scope of the address range, processor bus control element 211 recognizes the access as illegal if the request is a write access and is addressed to the shared memory owned by another group. When an illegal access is detected, an fault process is activated. Since the fault process is well-known, the explanation has been omitted.

When an illegal access is not detected, processor bus control element 211 issues the request to system bus control element 213. System bus control element 213 transmits the request to system bus 105.

The system bus control units 213 of all nodes 101 through 104 receive the request through system bus 105, and transmit the address to each of the corresponding cluster configuration controller 121. Since bit 63 of the address of this request is 1, each cluster configuration controller 121 recognizes that this request is addressed to the shared memory.

By referring to the values of bits 61 and 62 of the address and the registers 512 and 515, cluster configuration controller 121 determines whether or not the request is addressed to the group to which the own node belongs. When the request is addressed to a group to which the own node belongs, cluster configuration controller 121 determines whether the request is addressed to the own node by referring to registers 513 and 514, and reports the result to system bus control element 213.

When the report indicates that the access to the shared memory of the own node, system bus control element 213 sets bits 61 through 63 of the address to 000, and transmits the request to main storage device interface element 212.

Upon receipt of the request from system bus control element 213, main storage device interface element 212 issues the request to main storage device 117, and the request is processed according to a predetermined procedure.

On the other hand, when the report from cluster configuration controller 121 to system bus control element 213 is not addressed to the own node, system bus control element 213 discards the request.

The configuration of the above described register and the configuration of an address format are examples for embodying the present invention. The present invention is not limited to these example.

As described above, it is possible to change a cluster configuration selectively in a system. In this case, groups forming a cluster are operated by a corresponding independent operating system. The communications between the operating systems can be synchronized using a shared memory. On the other hand, when a cluster configuration is not adopted, the entire system is operated by one operating system as in the conventional technology. Thus, a system with a cluster configuration or a system without a cluster configuration can be selected in a system. In addition, a group configuring a cluster can be arbitrarily set by setting registers, thereby a configuration can be appropriately selected depending on the purpose of the operation of a system.

Furthermore, since there is a mechanism provided for detecting illegal access, the operations of one group forming a cluster do not influence on the other groups.

While this invention has been described in conjunction with the preferred embodiments described above, it will now be possible for those skilled in the art to put this invention into practice in various other manners.

What is claimed is:

1. A data processing apparatus comprising:
   a plurality of nodes each of which includes at least one processor;
   a bus to which said nodes are connected;
   memory elements provided in said nodes, respectively;
   a first element which sets said nodes to clusters; and
   shared memory areas which are provided in said clusters, respectively, and to which said nodes of any of said clusters access;
   wherein said first element includes a first register which indicates said clusters to which said nodes belong and a second register which indicates whether or not said apparatus operates in said clusters.

2. The data processing apparatus as claimed in claim 1, wherein said first element includes a third register which indicates which of said node has said shared memory area.

3. The data processing apparatus as claimed in claim 2, wherein said first element determines whether the access is addressed to said shared memory area of its own cluster or the other clusters.

4. The data processing apparatus as claimed in claim 1, wherein said first element detects an illegal access which is addressed beyond a predetermined address range.

5. The data processing apparatus as claimed in claim 4, wherein said first element includes a third register which indicates said predetermined address range.

6. The data processing apparatus as claimed in claim 1, further comprising a specific memory area which corresponds to each of said clusters and in which an access from the other clusters is inhibited.

7. The data processing apparatus as claimed in claim 6, wherein said first element determines whether the access is addressed to said specific memory area of its own cluster or the other clusters.

8. The data processing apparatus as claimed in claim 1, wherein a plurality of said nodes belongs to one cluster.

9. A data processing apparatus comprising:
   a plurality of nodes each of which includes at least one processor, each node belonging to a group among a plurality groups;
   a bus to which said nodes are connected;
   memory elements provided in said nodes, respectively;
   shared memory areas which are provided in said groups, respectively, and to which said nodes of any of said groups access; and
   first elements which are provided in said nodes, respectively, and which identify groups to which the nodes belong;
   wherein said first element includes a first register to indicate the groups to which said nodes belong and a second register which indicates whether or not said apparatus operates in said groups.

10. The data processing apparatus as claimed in claim 9, wherein said nodes communicate with each other by using said shared memory.

11. The data processing apparatus as claimed in claim 9, wherein each of said groups are operated by a corresponding operating system.

12. The data processing apparatus as claimed in claim 9, further comprising a specific memory area which corresponds to each of said groups and in which an access from the other groups is inhibited.

13. The data processing apparatus as claimed in claim 9, wherein a plurality of said nodes belongs to one group.

* * * * *